US012759664B2

(12) United States Patent
Callahan et al.

(10) Patent No.: US 12,759,664 B2
(45) Date of Patent: Oct. 13, 2026

(54) APPARATUS AND METHOD FOR CONVERTING A MULTI-GEAR BICYCLE TO A SINGLE GEAR BICYCLE

(71) Applicant: Quality Bicycle Products, GBC, Bloomington, MN (US)

(72) Inventors: Ryan Callahan, Eden Prairie, MN (US); Graham Walker, Bloomington, MN (US)

(73) Assignee: QUALITY BICYCLE PRODUCTS, GBC, Bloomington, MN (US)

( * ) Notice: Subject to any disclaimer, the term of this patent is extended or adjusted under 35 U.S.C. 154(b) by 309 days.

(21) Appl. No.: 18/666,026

(22) Filed: May 16, 2024

(65) Prior Publication Data

US 2025/0353577 A1 Nov. 20, 2025

(51) Int. Cl.
*B62K 25/02* (2006.01)

(52) U.S. Cl.
CPC .................................... *B62K 25/02* (2013.01)

(58) Field of Classification Search
CPC ...................................................... B62K 25/02
See application file for complete search history.

(56) References Cited

U.S. PATENT DOCUMENTS 8,740,239 B2 * 6/2014 Lumpkin ............... B62K 19/30 280/285
8,899,606 B2 * 12/2014 Cocalis .................. B62K 19/24 280/281.1
2014/0049020 A1 * 2/2014 Wendt .................... B62K 25/02 280/274
2019/0032233 A1 1/2019 Wang et al.
2020/0298933 A1 9/2020 Braedt
2021/0276663 A1 * 9/2021 Nelson ................... B62M 9/135

FOREIGN PATENT DOCUMENTS

EP 2716534 A1 * 4/2014 ............ B62K 19/30

* cited by examiner

*Primary Examiner* — Kevin Hurley
(74) *Attorney, Agent, or Firm* — Bradley J. Thorson; DeWitt LLP

(57) ABSTRACT

A dropout insert which may be used in combination with a replacement axle and a bolt to convert a multi-gear bicycle having either a SRAM universal derailleur hanger or SRAM T-type transmission into a single gear bicycle.

3 Claims, 10 Drawing Sheets

APPARATUS AND METHOD FOR CONVERTING A MULTI-GEAR BICYCLE TO A SINGLE GEAR BICYCLE

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention The present invention relates generally to bicycles that employ either a SRAM Deutschland GmbH Universal Derailleur Hanger (hereinafter, "SRAM UDH" or "SRAM universal derailleur") or a SRAM T-type transmission. The present invention relates more specifically to equipment and methods for converting such a multi-gear bicycle to a single gear bicycle.

II. Discussion of the Prior Art

The SRAM UDH is generally shown and described in U.S. Patent Publication No. 2019/0322333 A1 dated Oct. 24, 2019. This derailleur hanger was released about five to six years ago and is now extremely popular and used on bikes offered under many different brands.

More recently the SRAM T-type transmission was introduced. The SRAM T-type transmission is shown and described in U.S. Patent Publication No. 2020/0298933 dated Sep. 24, 2020. The introduction of the SRAM T-type transmission was significant because it created a new rear derailleur that, instead of attaching to a hanger, mounts directly to the frame. So, while the T-type transmission replaces the SRAM UDH, frames that were made for a SRAM UDH can also accept the SRAM T-type transmission (and vice versa). In other words, frames created for either the SRAM UDH or T-Type transmission could be used with either the SRAM UDH or T-type transmission.—

There are times, however, when an owner of a multi-gear bicycle, employing either the SRAM UDH or SRAM T-type transmission, would like to convert the bicycle so that the bicycle becomes a single gear bicycle. To date, there have been no simple-to-install and cost-effective mechanisms for carrying out such a conversion on such a bicycle. Thus, there exists a real need in the art for methods and components that enable conversion of a multi-speed bicycle employing either a SRAM UDH or SRAM T-type transmission to single speed bicycles.

SUMMARY OF THE INVENTION

Multi-gear bicycles employing either a SRAM UDH or SRAM T-type transmission typically include a chain, an axle, a derailleur hanger, and a dropout. The dropout has an inboard side and an outboard side, and typically comprises a curved wall with a first hole extending through the curved wall. The curved wall defines an outer center channel, and has two spaced apart ends defining a first space.

Various parts, which may be provided separately or as a kit, are required to convert such a multi-gear bicycle into a single gear bicycle. These parts include a dropout insert, a replacement axle, and a bolt. In one embodiment, the dropout insert has (i) a first portion having an inner center channel and configured to be inserted from the inboard side of the dropout into the outer center channel, (ii) a second portion having a first surface, a second surface and a curved surface between the first surface and second surface, and (iii) a third portion joining the first and second portion. The first surface of the second portion is configured to engage one of the two spaced apart ends of the dropout and the second surface of the second portion is configured to engage the other of the two spaced apart ends of the dropout. The curved surface is configured to cooperate with the inner center channel of the first portion of the dropout insert and the first space between the first and second ends of the dropout to define an elongated slot. A second hole extending through the first portion of the dropout insert and is configured to be aligned with the first hole of the dropout when the first portion is inserted from the inboard side of the dropout into said outer center channel of the dropout. The replacement axle is configured to extend through the elongated slot. The bolt is configured to be inserted into the first hole and second hole when the first hole and second hole are aligned. This bolt is further configured to apply rearward pressure on the axle to tension the chain.

The conversion process includes various steps. First, the original axle, SRAM UDH, and bushing washer (if one is present) are removed. The dropout insert is then inserted from the inboard side of the dropout into said outer center channel of the dropout with the first surface of the dropout insert engaging a first of the two spaced apart ends of the dropout and the second surface of the dropout insert engaging the second of the two spaced apart ends of the dropout. The replacement axle is then inserted through the elongated slot formed by the curved surface and inner center channel of the dropout insert, and the first space of the dropout. The first hole through the dropout and the second hole extending through the first portion of the dropout insert are then aligned (if not already aligned) and the end of a bolt is passed through these holes and used as a pusher to apply rearward pressure on the axle to tension the chain.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
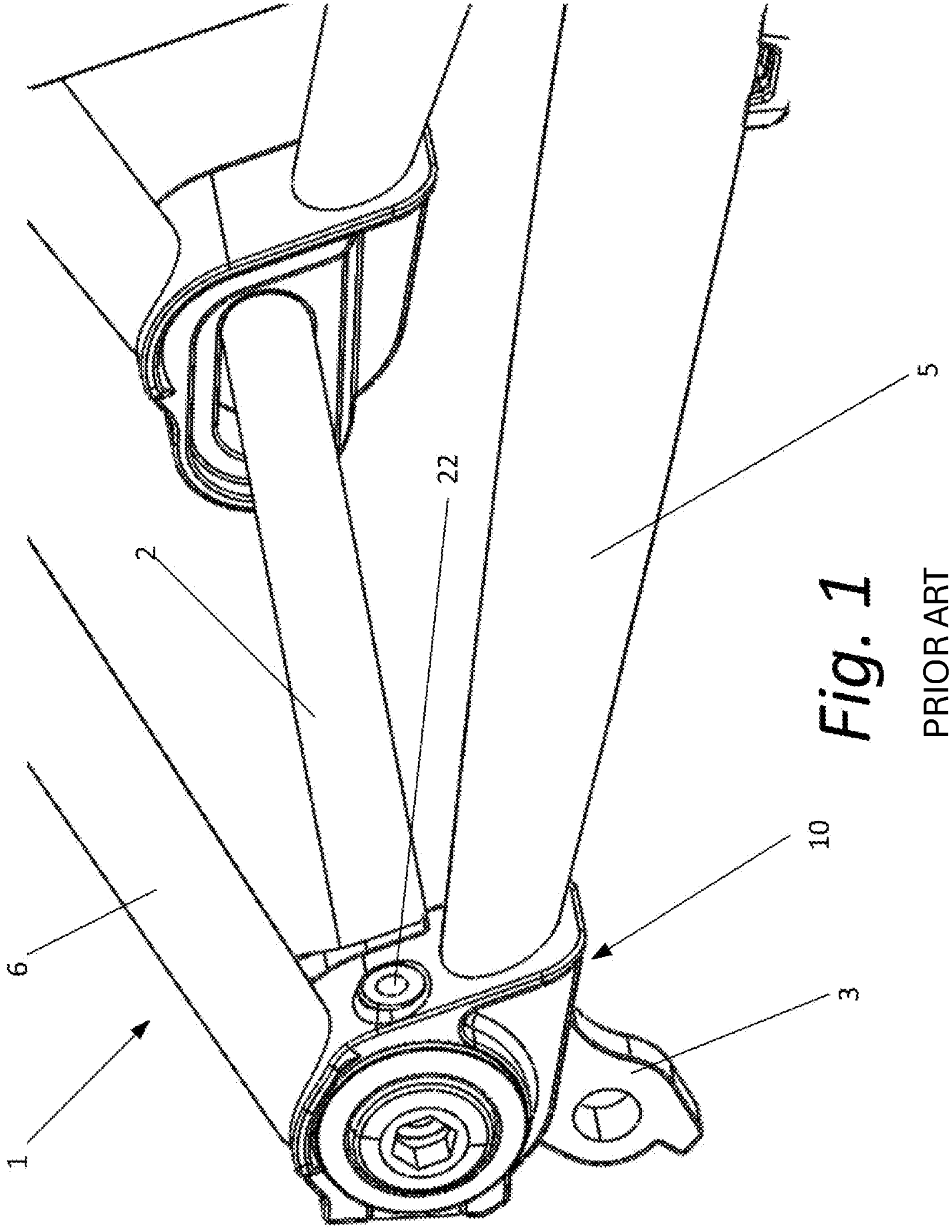
Fig. 1 PRIOR ART
FIG. 1 is a perspective view of the assembly of a multi-gear bicycle used to attach the bicycle's rear wheel to the bicycle's frame.
Figure 2:
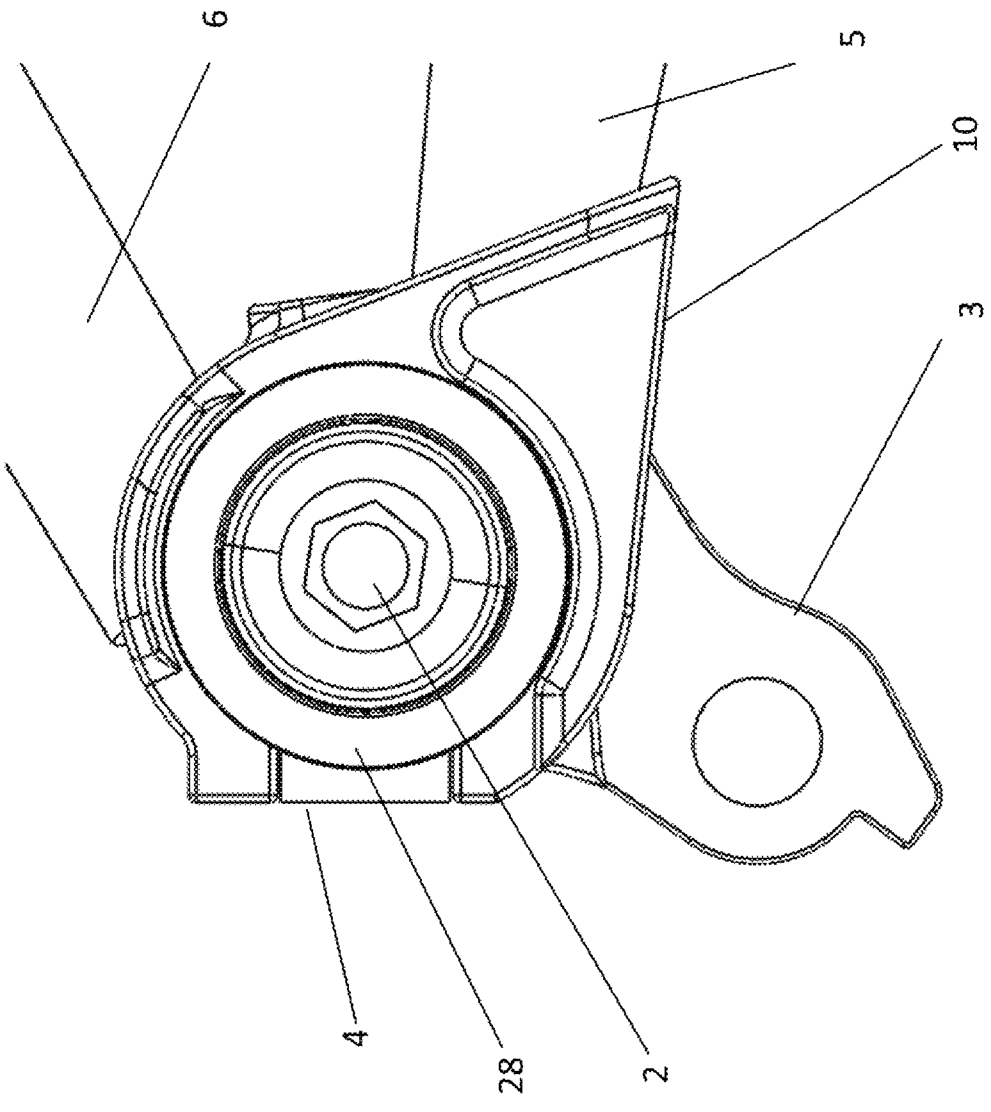
Fig. 2 PRIOR ART
FIG. 2 is a plan view of the left side of the assembly of FIG. 1.
Figure 3:
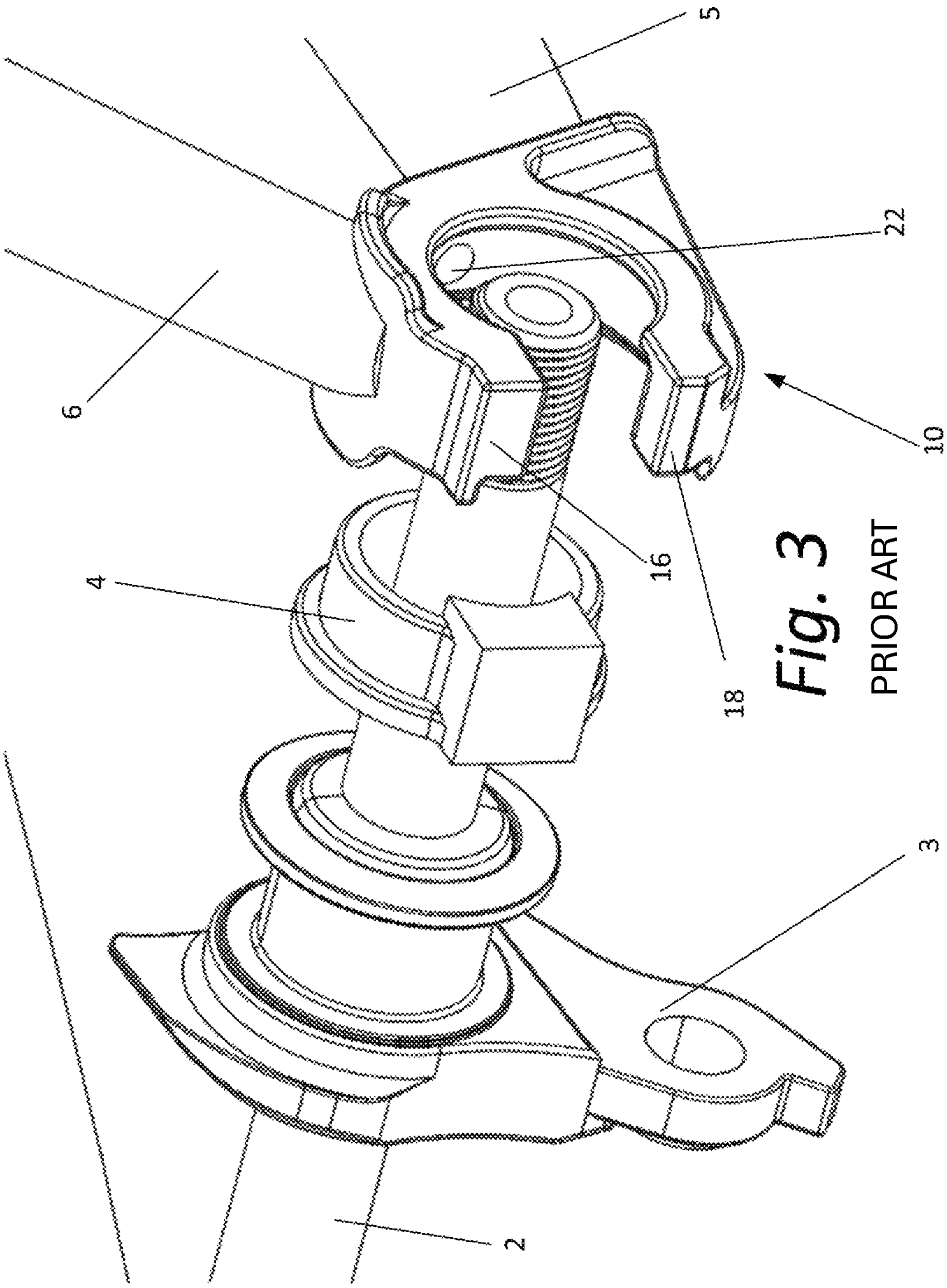
Fig. 3 PRIOR ART
FIG. 3 is an exploded perspective view of the left side of the assembly of FIG. 1.
Figure 4:
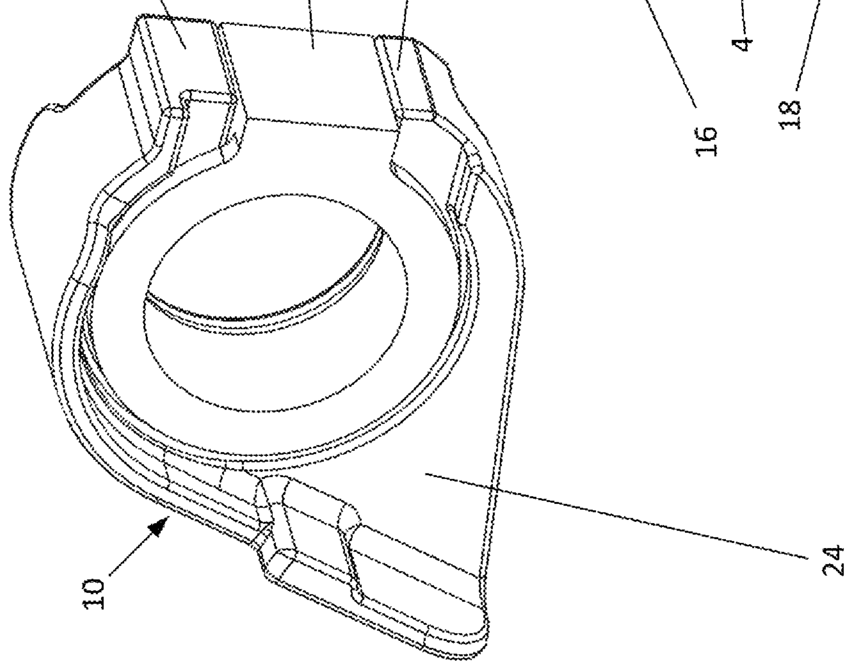
Fig. 4 PRIOR ART
FIG. 4 is a perspective view showing the inboard side of the dropout and bushing washer of the assembly of FIG. 1.
Figure 5:
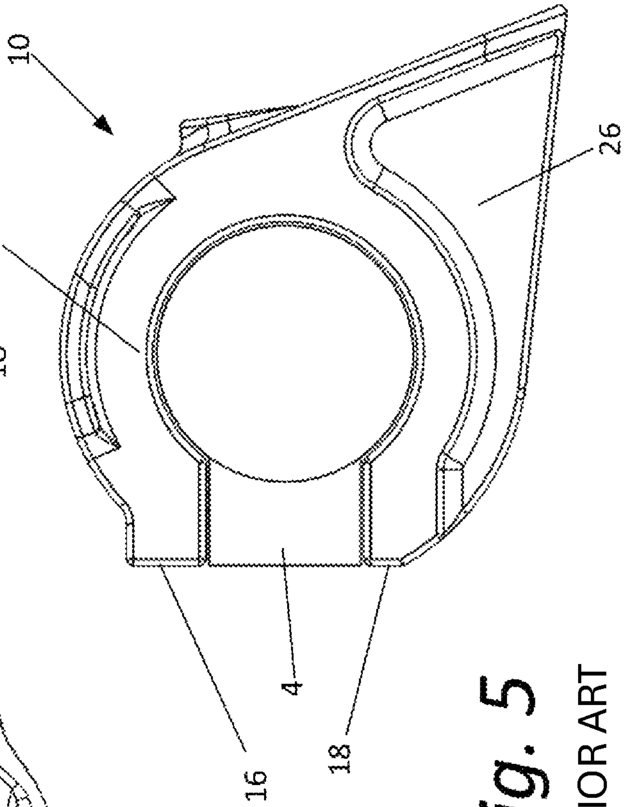
Fig. 5 PRIOR ART
FIG. 5 is a plan view showing the outboard side of the dropout and bushing washer of FIG. 1.
Figure 7:
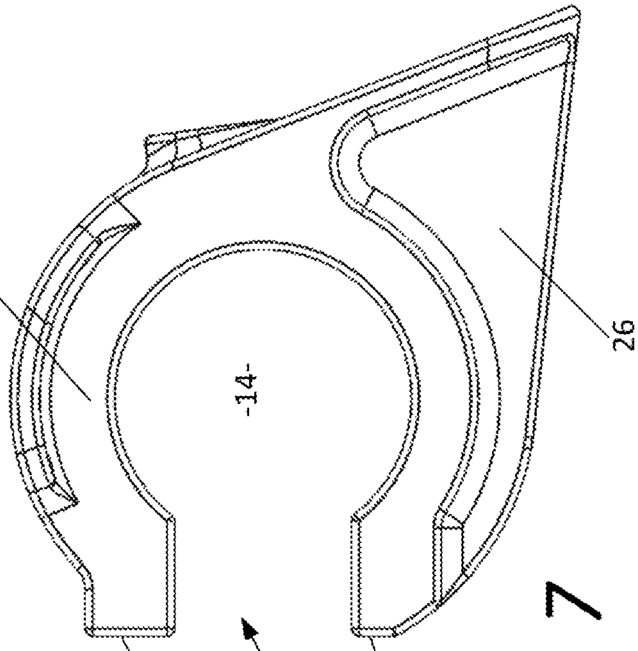
Fig. 7 PRIOR ART
FIG. 7 is a plan view showing the outboard side of the dropout of FIG. 1.
Figure 6:
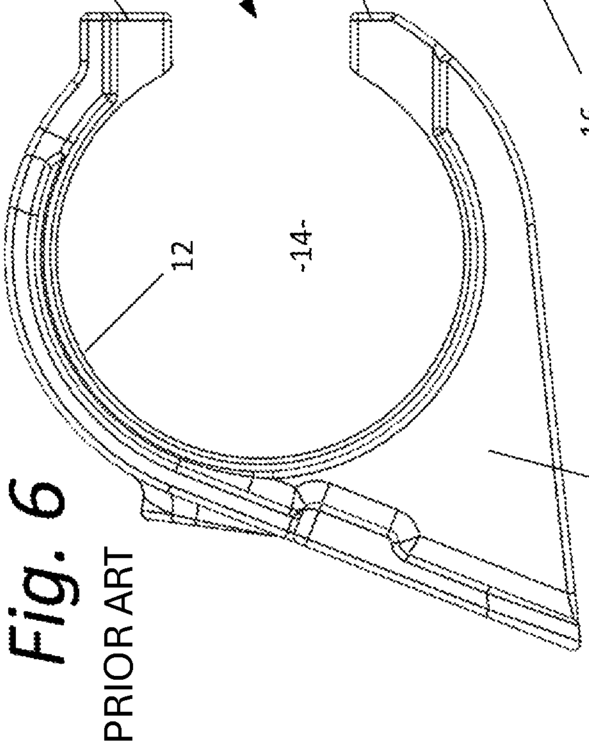
Fig. 6 PRIOR ART
FIG. 6 is a plan view showing the inboard side of the dropout of FIG. 1.
Figure 8:
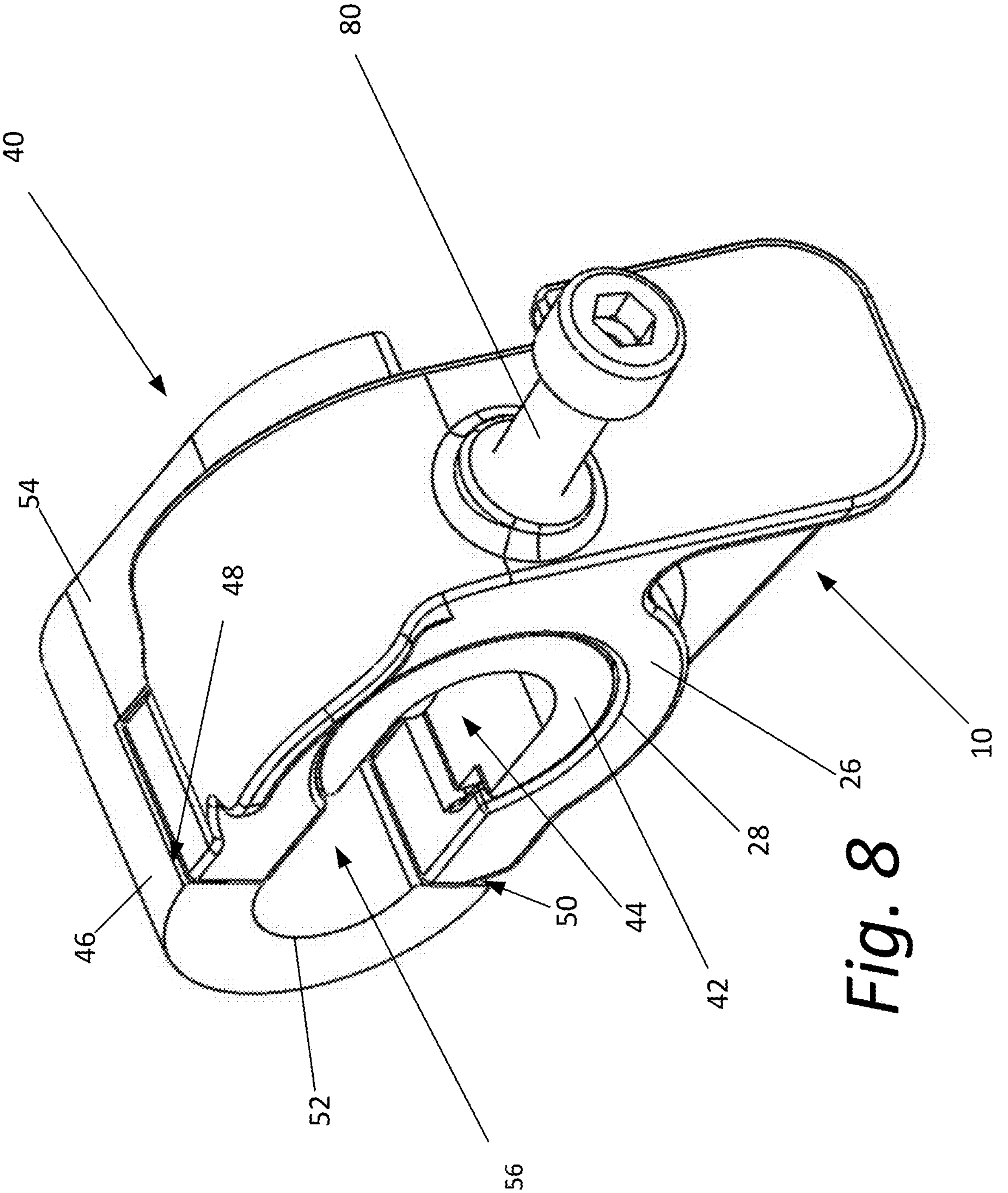
FIG. 8 is a first perspective view of a dropout insert and a bolt coupled to the dropout of FIG. 1.
Figure 9:
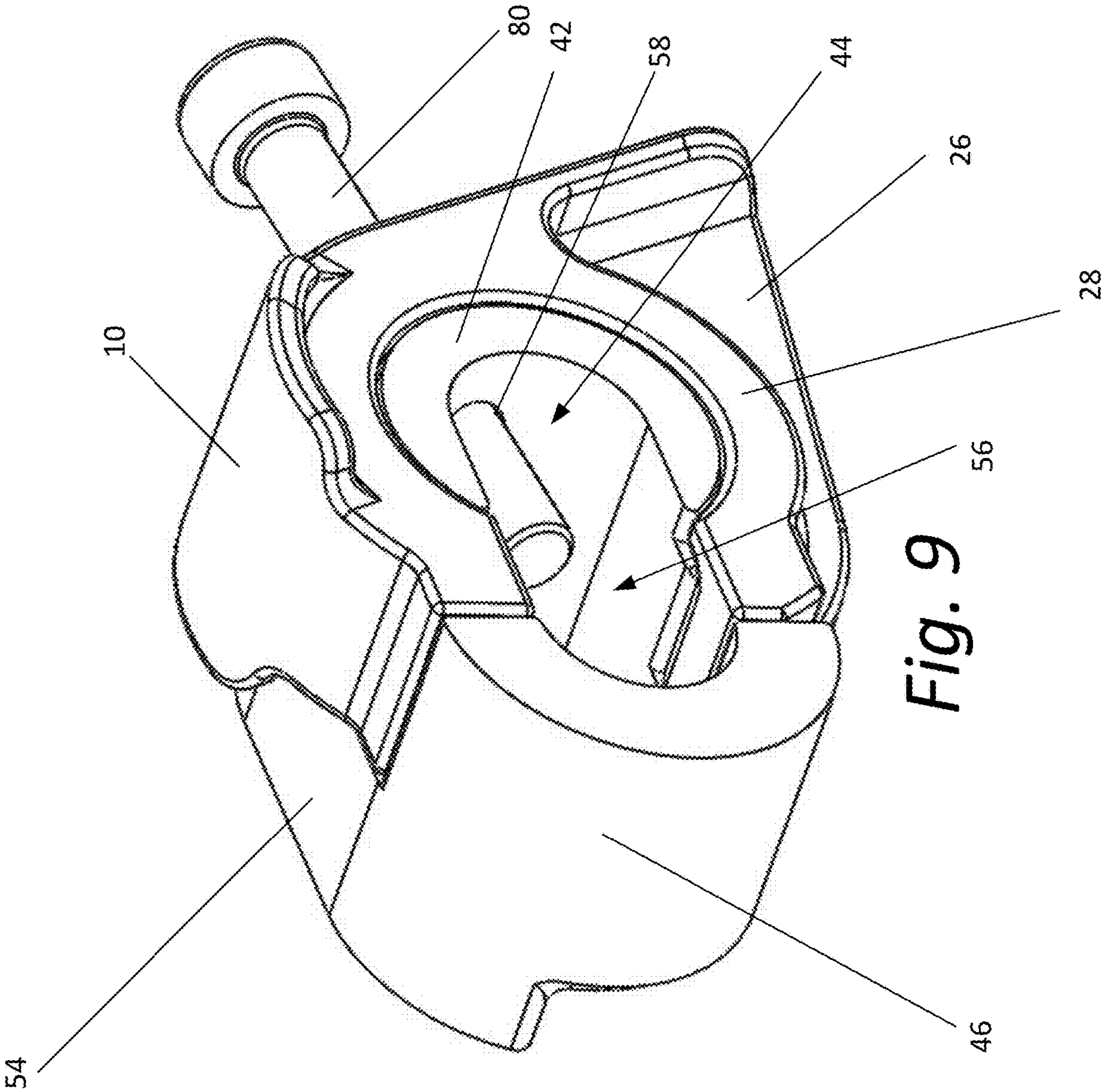
FIG. 9 is a second perspective view of a dropout insert and a bolt coupled to the dropout of FIG. 1.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

As shown in FIGS. 1-7, the rear wheel (not shown) of a multi-gear bicycle 1 may be attached using an axle 2. The assembly also includes a SRAM UDH 3 coupled to axle 2, a bushing washer 4 and a dropout 10. Dropout 10 is typically attached to both a chain stay 5 and seat stay 6 of the bicycle's frame.

Dropout 10, has a curved wall 12 with a bolt hole 22 extending therethrough, an outer center channel 14, a first spaced apart end 16, and a second spaced apart end 18 such that a space 20 is formed between spaced apart ends 16 and 18. The outer center channel 14 and space 20 are unobstructed at the inboard side 24 and across the width of dropout 10 except at the outboard side 26. As shown, outboard side 26 of dropout 10 includes a flange projecting into and narrowing of the outer center channel 14 at the outboard side 26.

When converting multi-gear bicycle 1 to a single gear bicycle, the first axle 2, SRAM UDH 3 and bushing washer 4 are removed while leaving the dropout 10 in place. A set of components, e.g., a kit, is then secured. These components include a dropout insert 40, a replacement axle 70, and a bolt 80.

Dropout insert 40 includes a first portion 42 configured to be inserted into the outer center channel 14 and engage the flange 28. First portion 42 has a curved wall that serves to form an inner center channel 44. Dropout insert 40 has a second portion 46 comprising a first surface 48 configured to engage the first spaced apart end 16 of dropout 10, a second surface 50 configured to engage the second spaced apart end 18 of dropout 10, and a curved surface 52 configured to cooperate with the inner center channel 44 and the space 20 to form an elongated slot 56. A third portion 54 of dropout insert 40 serves to hold the first portion 42 and the second portion 46 together.

Figure 10:
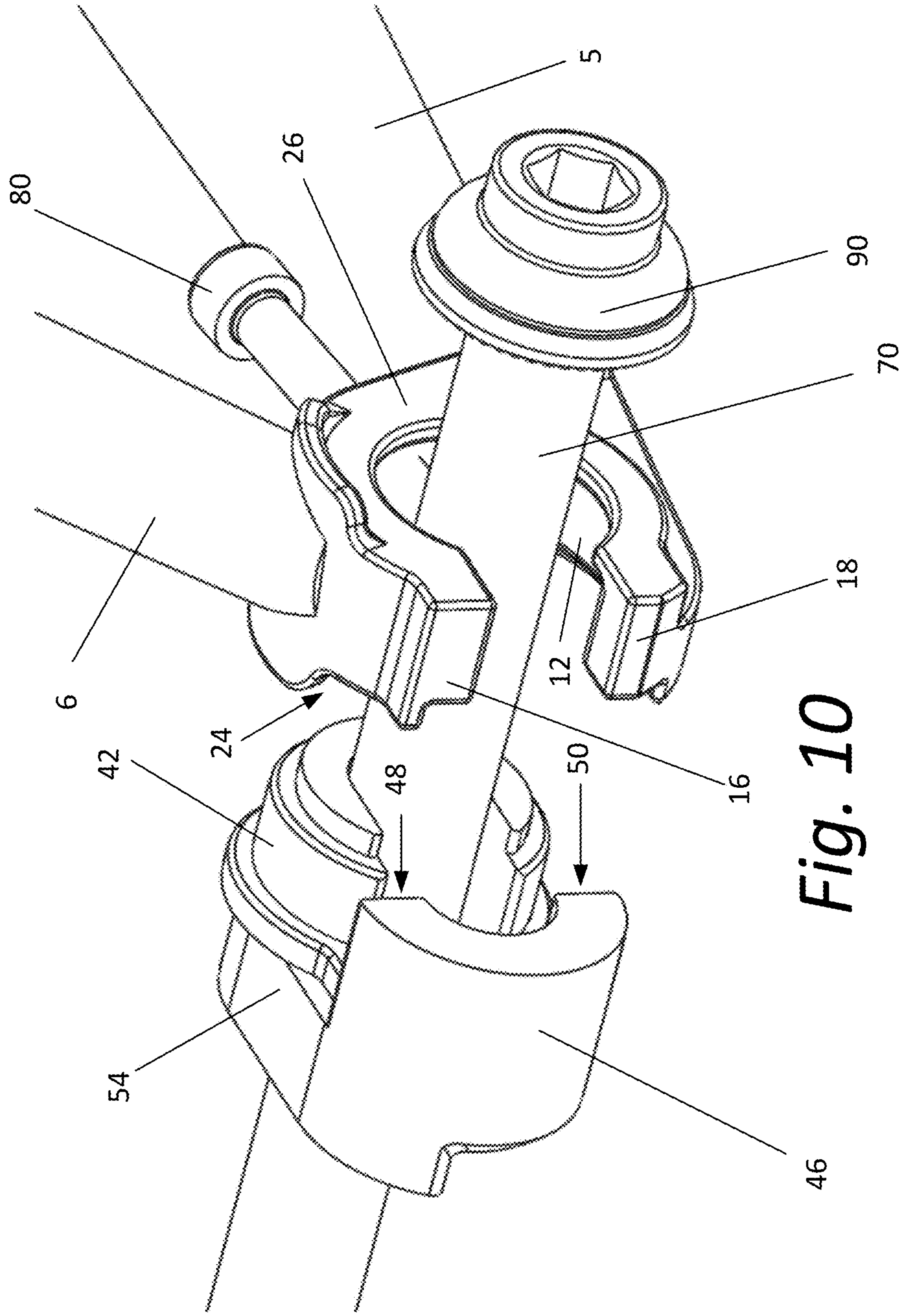
FIG. 10 is an exploded perspective view of a dropout insert, bolt, and replacement axle to be coupled to the dropout of FIG. 1.
Figure 11:
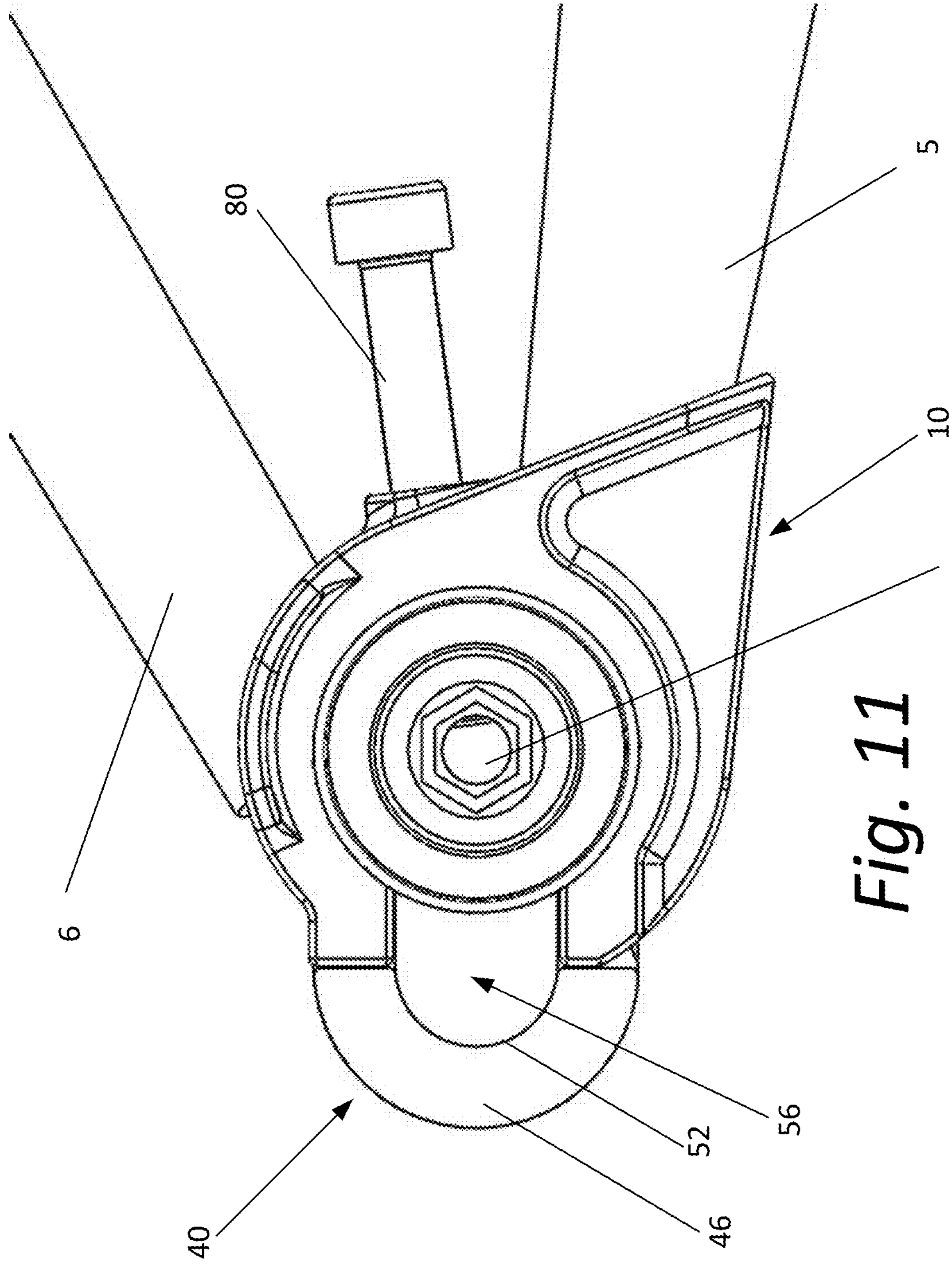
FIG. 11 is a plan view of the outboard side of the assembly of FIG. 10.
Figure 12:
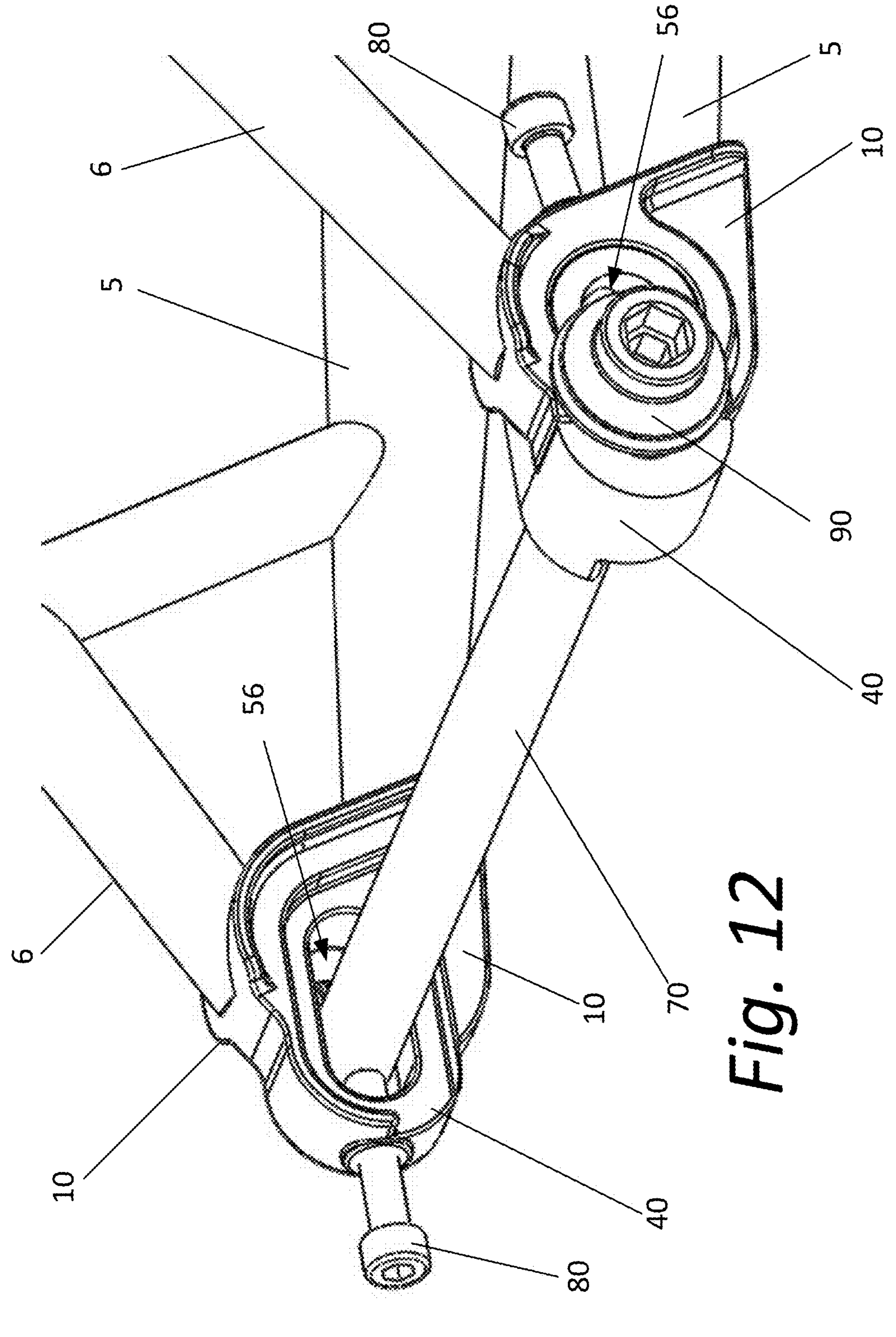
FIG. 12 is a perspective view of the assembly of a bicycle used to attach the bicycle's rear wheel to the bicycle's frame after the bicycle has been converted from a multi-gear bicycle to a single gear bicycle.

As shown in FIGS. 10-12, the replacement axle 70 extends through the inner center channel 44 of dropout insert 40 and through the outer center channel 14 of the dropout 10. Dropout insert 40 is then slid toward the dropout 10, and positioned with (a) the first portion 42 of dropout insert 40 residing in the outer center channel 14 of the dropout 10, (b) the first surface 48 of dropout insert 40 in engagement with the first spaced apart end 16 of the dropout 10, and (c) the second surface 50 of dropout insert 40 in engagement with the second spaced apart end 18 of the dropout 10. When so positioned, dropout insert 40 and dropout 10 form an elongated slot 56 defined by the inner center channel 44 and the curved surface 52 of dropout insert 10 and space 20 between the two spaced apart ends 16 and 18 of dropout 10. An axle extends through this slot 56. Further, first hole 22 of the dropout 10 and second hole 58 of the dropout insert 40 are aligned such that an end of the bolt 80 can be inserted through holes 22 and 58 and into the elongated slot 56. The bolt 80 serves a pusher to position the replacement axle 70 to tension the bicycle chain (not shown) as desired.

One skilled in the art will appreciate that the components described above have other features not shown in the drawings. For example, either or both holes 22 and 58 may have internal threads configured to mesh with external threads on bolt 80. Likewise, the end(s) of the replacement axle 70 may be threaded for purposes of connecting hub(s) 90 to the replacement axle 70. As shown in FIG. 12, separate identical kits or sets of components may be used to couple to two ends of the replacement axle 70 to the two dropouts 10 of the bicycle 1.

One skilled in the art will also recognize that the components described above may be made of a variety of materials, e.g., steel, aluminum, other metal alloys, carbon fiber, and even some plastics.

This invention has been described herein in considerable detail to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. For a bicycle having a chain and a dropout having a curved wall defining an outer center channel and having two spaced apart ends defining a first space, a first hole extending through the curved wall, an inboard side and an outboard side, a dropout insert comprising:

(i) a first portion having an inner center channel and configured to be inserted into said outer center channel;

(ii) a second portion having a first surface, a second surface and a curved surface between the first surface and second surface, wherein the first surface is configured to engage a first of the two spaced apart ends and the second surface is configured to engage a second of the two spaced apart ends, and the curved surface is configured to cooperate with the inner center channel and the first space to define an elongated slot; and (iii) a second hole extending through said first portion configured to be aligned with the first hole when the first portion is within said outer center channel.

2. For a multi-gear bicycle having a chain and a dropout having a curved wall defining an outer center channel and having two spaced apart ends defining a first space, a first hole extending through the curved wall, an inboard side and an outboard side, a set of components for converting said multi gear bicycle into a single-gear bicycle comprising:

(a) a dropout insert having:

(i) a first portion having an inner center channel and configured to be inserted into said outer center channel;

(ii) a second portion having a first surface, a second surface and a curved surface between the first surface and second surface, wherein the first surface is configured to engage a first of the two spaced apart ends and the second surface is configured to engage a second of the two spaced apart ends, and the curved surface is configured to cooperate with the inner center channel and the first space to define an elongated slot; and (iii) a second hole extending through said first portion configured to be aligned with the first hole when the first portion is within said outer center channel;

(b) a replacement axle configured to extend through the elongated slot; and (c) a bolt configured to be inserted into the first hole and second hole when the first hole and second hole are aligned, and further configured to apply rearward pressure on the axle to tension the chain.

3. A method for converting, to a single gear bicycle, a multi-gear bicycle having a chain, a first axle, a derailleur hanger, and a dropout having a curved wall defining an outer center channel and having two spaced apart ends defining a first space, a first hole extending through the curved wall, an inboard side and an outboard side, said method comprising:

(a) removing the first axle and derailleur hanger;

(b) coupling a dropout insert to the dropout, said dropout insert having:

(i) a first portion having an inner center channel and configured to be inserted from the inboard side of the dropout into said outer center channel;

(ii) a second portion having a first surface, a second surface and a curved surface between the first surface and second surface, wherein the first surface is configured to engage one of the two spaced apart ends and the second surface is configured to engage the other of the two spaced apart ends, and the curved surface configured to cooperate with the inner center channel and the first space to define an elongated slot; and (iii) a second hole extending through said first portion configured to be aligned with the first hole when the first portion is positioned within the outer center channel of the dropout;

(c) inserting a replacement axle through the elongate slot; and (d) aligning the first hole and the second hole, and inserting a bolt into the aligned first hole and second hole, and further using the bolt to apply rearward pressure on the axle to tension the chain.

* * * * *